United States Defensive Publication [19] (H) [11] T986,004

Stroup et al. [43] Sep. 4, 1979

[54] HYDRAULIC SYSTEM FOR HARVESTING MACHINES

[75] Inventors: Norman G. Stroup, Orion; Eugene J. Krukow, Cordova, both of Ill.

[73] Assignee: International Harvester Company, Chicago, Ill.

[21] Appl. No.: 939,307

[22] Filed: Sep. 5, 1978

[51] Int. Cl.[2] ..... F15B 11/16

[52] U.S. Cl. ..... 91/516; 91/530; 91/532; 60/422; 60/484

[57] ABSTRACT

An open center hydraulic system in which a pair of flow divider valves is connected in series with the system's hydraulic pump to create a parasitic pressure upstream of these flow valves and the feeder and separator clutches are controlled remotely by simple solenoid actuated two-position valves. The cylinders actuating the clutches are of sufficient size upon application of the minimum parasitic pressure to hold the clutches in a given position so that no center neutral position is necessary on the two-position valves.

4 Claims, 1 Sheet Drawing,

11 Pages Specification

The file of this unexamined application may be inspected and copies thereof may be purchased (849 O.G. 1221, Apr. 9, 1968).

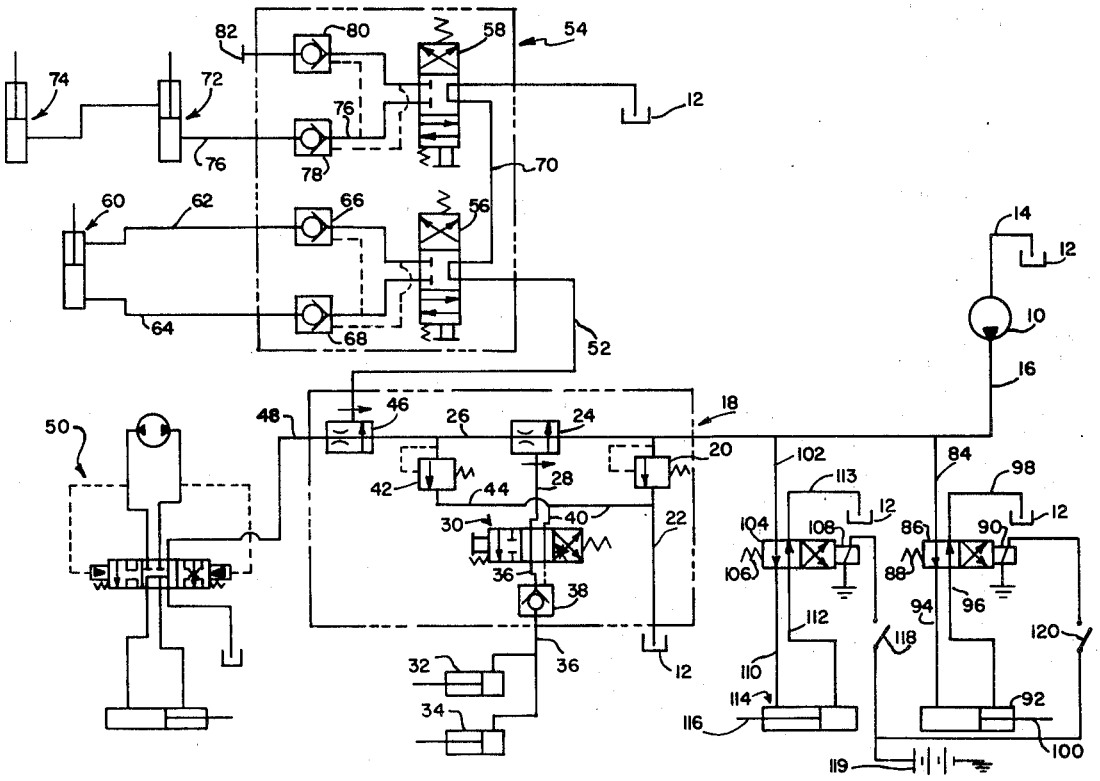

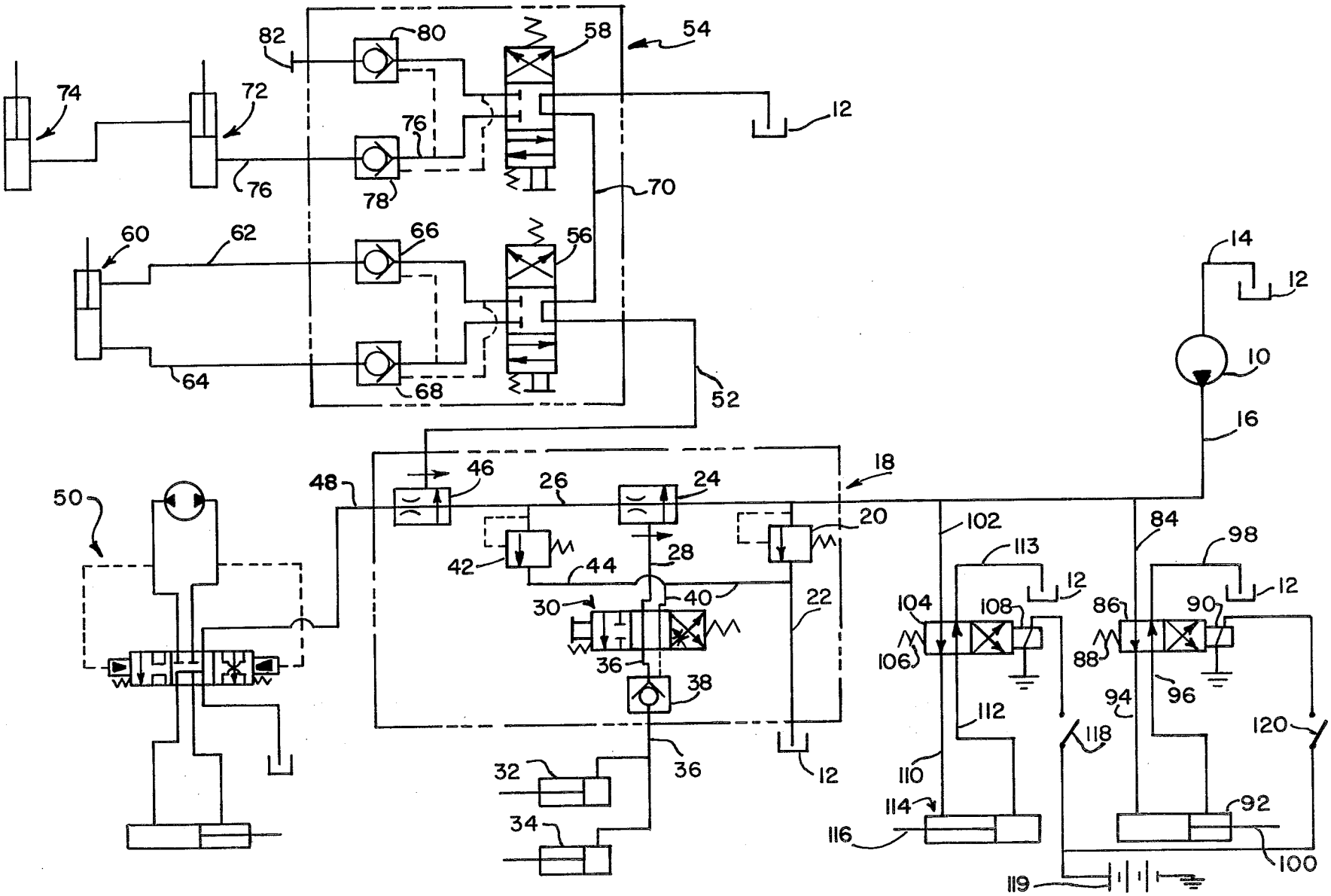
10
12
14
16
18
20
22
24
26
28
30
32
34
36
38
40
42
44
46
48
50
52
54
56
58
60
62
64
66
68
70
72
74
76
78
80
82
84
86
88
90
92
94
96
98
100
102
104
106
108
110
112
113
114
116
118
119
120